(12) United States Patent
Tsunedomi et al.

(10) Patent No.: US 8,774,162 B2
(45) Date of Patent: Jul. 8, 2014

(54) REAL TIME CONTROL NETWORK SYSTEM

(75) Inventors: Kunihiko Tsunedomi, Hitachi (JP);
Kenichi Kurosawa, Hitachi (JP)

(73) Assignee: Hitachi Automotive Systems, Ltd.,
Hitachinaka-shi (JP)

( * ) Notice: Subject to any disclaimer, the term of this patent is extended or adjusted under 35 U.S.C. 154(b) by 557 days.

(21) Appl. No.: 13/131,512

(22) PCT Filed: Nov. 25, 2009

(86) PCT No.: PCT/JP2009/006340
§ 371 (c)(1),
(2), (4) Date: May 26, 2011

(87) PCT Pub. No.: WO2010/064381
PCT Pub. Date: Jun. 10, 2010

(65) Prior Publication Data
US 2011/0228796 A1    Sep. 22, 2011

(30) Foreign Application Priority Data

Dec. 1, 2008 (JP) ................................. 2008-305818

(51) Int. Cl.
*H04J 3/06* (2006.01)
*H04L 12/413* (2006.01)

(52) U.S. Cl.
USPC ........... 370/350; 370/458; 370/503; 370/509; 701/1

(58) Field of Classification Search
None
See application file for complete search history.

(56) References Cited

U.S. PATENT DOCUMENTS

| | | | |
|---|---|---|---|
| 7,310,327 B2 * | 12/2007 | Fehr | 370/350 |
| 2004/0213295 A1 * | 10/2004 | Fehr | 370/503 |
| 2006/0224394 A1 | 10/2006 | Ungermann et al. | |
| 2008/0198868 A1 * | 8/2008 | Fuehrer | 370/442 |
| 2009/0125592 A1 | 5/2009 | Hartwich et al. | |

FOREIGN PATENT DOCUMENTS

| CN | 1784325 A | 6/2006 |
|---|---|---|
| JP | 2006-317238 A | 11/2006 |
| JP | 2006-525725 A | 11/2006 |
| JP | 2008-509584 A | 3/2008 |
| WO | WO 2004/098955 A1 | 11/2004 |
| WO | WO 2006/013212 A1 | 2/2006 |

OTHER PUBLICATIONS

Corresponding International Search Report (Form PCT/ISA/210) dated Dec. 22, 2009, with English Translation (Three (3) pages).
EP 1 622 794 A0 (one(1) page), corresponds to WO 2004/098955 A1 which was filed on May 26, 2011.

* cited by examiner

*Primary Examiner* — Hassan Phillips
*Assistant Examiner* — Hicham Foud
(74) *Attorney, Agent, or Firm* — Crowell & Moring LLP

(57) ABSTRACT

Provided is an on-vehicle network which can improve the network use efficiency and reduce the controller processor overhead even when the same communication cycle as the frame cannot be set in the filtering condition of a communication control device. A reference signal transmission controller is arranged in a network so as to generate and transmit a reference signal in accordance with the communication cycle. A reference signal reception controller receives the reference signal and compares the reference signals to a predetermined filtering condition table. If the signal is matched with the table, the controller executes a data reception process and a data transmission process.

17 Claims, 13 Drawing Sheets

FIG. 4

| COMMUNI-CATION CYCLE | SLOT | | |
|---|---|---|---|
| | 0 | 1 | 2 |
| 0 | | | ROUND 0 |
| 1 | | FRAME B | |
| 2 | | | |
| 3 | | | |
| 0 | | FRAME B | ROUND 1 |
| 1 | | | |
| 2 | | | |
| 3 | | FRAME B | |
| ... | ... | ... | ... |

COMMUNICATION CYCLE : 10msec
TRANSMISSION AND RECEPTION CYCLE OF FRAME B : 30msec

FIG. 5

(a) TRANSMITTING

| ROUND | COMMUNICATION CYCLE | RECEPTION FRAME ID | TRANSMISSION FRAME ID |
|---|---|---|---|
| 0 | 1 |  | B |
| 0 | 0 |  | B |
| 1 | 3 |  | B |
| ... | ... |  | ... |

(b) RECEIVING

| ROUND | COMMUNICATION CYCLE | RECEPTION FRAME ID | TRANSMISSION FRAME ID |
|---|---|---|---|
| 0 | 1 | B |  |
| 0 | 0 | B |  |
| 1 | 3 | B |  |
| ... | ... | ... |  |

| COMMUNI-CATION CYCLE | SLOT | | |
|---|---|---|---|
| | 0 | 1 | 2 |
| 0 | | | CYCLE 3 OFFSET 1 |
| 1 | | FRAME B | |
| 2 | | | |
| 3 | | | CYCLE 3 OFFSET 1 |
| 0 | | FRAME B | |
| 1 | | | |
| 2 | | | CYCLE 3 OFFSET 1 |
| 3 | | FRAME B | |
| ... | ... | ... | ... |

COMMUNICATION CYCLE : 10msec
TRANSMISSION AND RECEPTION CYCLE OF FRAME B : 30msec

FIG. 9

(a) TRANSMITTING

| COMMAND | RECEPTION FRAME ID | TRANSMISSION FRAME ID |
|---|---|---|
| CYCLE 3 OFFSET 1 | B | |
| | | |
| | | |
| ... | ... | |

(b) RECEIVING

| COMMAND | RECEPTION FRAME ID | TRANSMISSION FRAME ID |
|---|---|---|
| CYCLE 3 OFFSET 1 | | B |
| | | |
| | | |
| ... | | ... |

FIG. 10

| ROUND | COMMUNICATION CYCLE | COMMAND SIGNAL |
|---|---|---|
| MAXIMUM VALUE | 0 | CYCLE 3 OFFSET 1 |
| 0 | 3 | CYCLE 3 OFFSET 1 |
| 1 | 2 | CYCLE 3 OFFSET 1 |
| ... | ... | |

*FIG. 12*

| PRIORITY | CONTROLLER ID |
|----------|---------------|
| 0 | 2 |
| 1 | 10 |
| 2 | 8 |
| ... | ... |

FIG. 14

| COMMUNI-CATION CYCLE | SLOT | | |
|---|---|---|---|
| | 0 | 1 | 2 |
| 0 | FRAME A | | |
| 1 | FRAME C | | |
| 2 | FRAME A | | |
| 3 | FRAME C | | |
| 0 | FRAME A | | |
| 1 | FRAME C | | |
| 2 | FRAME A | | |
| 3 | FRAME C | | |
| ... | ... | ... | ... |

COMMUNICATION CYCLE : 10msec
TRANSMISSION AND RECEPTION CYCLE OF FRAME A : 20msec
TRANSMISSION AND RECEPTION CYCLE OF FRAME C : 20msec

FIG. 15

| COMMUNI-CATION CYCLE | SLOT | | |
|---|---|---|---|
| | 0 | 1 | 2 |
| 0 | | FRAME B | |
| 1 | | | |
| 2 | | | |
| 3 | | FRAME B | |
| 0 | | | |
| 1 | | | |
| 2 | | FRAME B | |
| 3 | | | |
| ... | ... | ... | ... |

COMMUNICATION CYCLE : 10msec
TRANSMISSION AND RECEPTION CYCLE OF FRAME B : 30msec

FIG. 16

| COMMUNI-CATION CYCLE | SLOT | | |
|---|---|---|---|
| | 0 | 1 | 2 |
| 0 | | FRAME B | |
| 1 | | FRAME B | |
| 2 | | FRAME B | |
| 3 | | FRAME B | |
| 0 | | FRAME B | |
| 1 | | FRAME B | |
| 2 | | FRAME B | |
| 3 | | FRAME B | |
| ... | ... | ... | ... |

COMMUNICATION CYCLE : 10msec
TRANSMISSION AND RECEPTION CYCLE OF FRAME B : 30msec

REAL TIME CONTROL NETWORK SYSTEM

TECHNICAL FIELD

The present invention relates to a real time control network system used for a real time process, and is used for a network for vehicle control and an industrial computer.

BACKGROUND ART

Recently, a time synchronous communication network has been used for an on-vehicle network which communicates among a plurality of on-vehicle electronics devices equipped on a vehicle in order to secure real-time process of communication. One of the examples of methods for the time synchronous communication is FlexRay. In FlexRay, one cycle of communication is referred to as a communication cycle. The communication cycle includes a plurality of slots and is previously assigned to each controller on a network. Each controller executes a transmission process of a frame or a reception process of a frame among assigned slots.

FIG. 1 is a schematic block diagram showing an on-vehicle network and controllers using a time synchronous communication network. As shown in FIG. 1, each of controllers 1, 2 is connected to a network (a network bus) and mainly includes a processor 11, a memory 12 and a communication control device 13. The communication control device 13 counts communication cycles and stores in a communication cycle counter 14. Each communication control device 13 in the controller 1 and the controller 2 exchanges the communication cycle 1004 among the communication control devices and controls the communication cycle 1004 to constantly keep the same value. A slot counter 18 is incremented from 0 at the starting time of the communication cycle.

A filtering condition 17 determines a condition of the communication cycle and the slot value when a frame transmission and frame reception are executed. In the frame transmission, the communication control device 13 transmits frames in which the communication cycle is matched with the slot value based on a filtering condition 17 from a transmission buffer 15 assigned to each frame. In the frame reception, the communication control device 13 receives the frames in which the communication cycle is matched with the slot value based on a filtering condition 17 from a network 3 and stores the frames in a reception buffer 16 which is statically assigned to each frame.

FIG. 14 shows an example of slot assignment when frame A and frame C are transmitted in a cycle from the controller 1 to the controller 2. A cycle length of the communication cycle is set to 10 msec (a length of the communication cycle counter), and a communication cycle of each frame is set to 20 msec (which is 2 when converted to the communication cycle counter). As shown in FIG. 14, when a filtering condition 17 of frame A is set to "communication cycle=2N (N is a number from 0 to 31)" and a filtering condition 17 of frame C is set to "communication cycle=2N+1 (N is a number from 0 to 31)", frame A and C can be transmitted and received using the same slot.

As described above, the time synchronous communication, which executes the frame transmission and the frame reception in synchronization with the communication cycle and the slot, does not generate competition on the network. As a result, bandwidths of the network can be used effectively.

PRIOR ART DOCUMENT

Patent Document

PATENT DOCUMENT 1: Japanese Unexamined Patent Application Publication (Translation of PCT Application) No. 2008-509584

DISCLOSURE OF THE INVENTION

Problem to be Solved by the Invention

In the above-described network system, it is assumed that the same communication cycle as the frame can be set in the filtering condition 17. In the filtering condition 17 of FlexRay, the communication cycle is limited to a power-of-two number from 1 to 64, more specifically, limited to 1, 2, 4, 8, 16, 32 and 64. Therefore, the frame transmission and reception other than in these communication cycles are required to be implemented by software stored in the memory 12.

For example, as shown in FIG. 16, there is a method in which a receiving controller controls the cycle. In this example, the communication cycle of frame B is 30 msec (which is 3 when converted to the communication cycle), so that the communication cycle which should execute the frame B communication cyclically repeats 0, 3, 2, 1 and 0. Accordingly, the transmission controller and the reception controller cannot be synchronized as for the communication cycle to start the communication at among the above-described communication cycles. As a result, the transmitting controller cannot determine the communication cycle in which the receiving controller receives frame B. Therefore, the transmitting controller transmits frame B in every communication cycle by using a continuous transmission mode of a static segment or a dynamic segment. The receiving controller receives frame B when the communication cycle counter proceeds in every 3 counts. In this method, frame B occupies the slot 1. This method is less effective because only a third of the network bandwidth can be used.

As another conventional method, as shown in FIG. 15, there is a method in which a transmitting controller controls the cycle. In this method, the transmitting controller transmits frame B in every 3 communication cycles by using a single shot mode of the static segment or the dynamic segment. The receiving controller, receiving frame B in every one communication cycle, reads the reception buffer in slot 1. When no new frame is in the reception buffer, the receiving controller determines that the communication cycle is not a communication cycle which should be received. In this method, frame B occupies the slot 1. This method is also less effective because only a third of the network bandwidth can be used. Moreover, a processor 11 of the receiving controller, which should read the reception buffer in every communication cycle, has large overhead.

The object of the present invention is to provide a real time control network system which can improve the efficiency in the use of the network and reduce the overhead of the processor in the controller even when the same communication cycle as the frame cannot be set in the filtering condition of a communication control device and to provide an on-vehicle network system using thereof.

Means for Solving the Problem

In order to achieve the above-described object, a real time control network system of the present invention includes, over a time synchronous network, one or more reference signal transmission controllers which broadcast a reference signal. All the controllers start a transmission process or a reception process in synchronization with the reference signal.

More specifically, one aspect of the real time control network system according to the present invention includes a plurality of controllers connected through a bus. Each of the controllers includes a transmission process unit which transmits a frame in every communication cycle with assigning a slot and a reception process unit which receives the frame from the assigned slot. The frame is transmitted and received among the controllers. The communication cycle is counted again from 0 after the communication cycle is counted from 0 to a maximum value. The plurality of controllers includes at least one reference signal transmission controller having a reference signal generation unit which receives the communication cycle and generates a reference signal, the reference signal acting as a reference for starting transmission of the frame or starting reception of the frame, and a reference signal transmission unit which transmits the reference signal. The plurality of controllers further includes at least one reference signal reception controller having a reference signal reception unit which receives the reference signal. Each of the controllers further includes a communication cycle update unit which keeps the communication cycle among the plurality of controllers the same, a filtering condition table which has the communication cycle at the time when the transmission process unit starts to transmit or at the time when the reception process unit starts to receive and has the reference signal, and a filtering process unit which compares the reference signal and the communication cycle to the filtering condition table and starts the transmission process unit or the reception process unit when the communication cycle and the reference signal match a condition of the filtering condition table.

Another aspect of the real time control network system according to the present invention includes a plurality of controllers connected through a bus. Each of the controllers includes a transmission process unit which transmits a frame in every communication cycle with assigning a slot and a reception process unit which receives the frame from the assigned slot. The frame is transmitted and received among the controllers. The communication cycle is counted again from 0 after the communication cycle is counted from 0 to the maximum value. Each of the controllers includes a communication cycle update unit which keeps the communication cycle among the plurality of controllers the same, a reference signal generation unit which receives the communication cycle and generates a reference signal, the reference signal acting as a reference for starting transmission of the frame or starting reception of the frame, a reference signal transmission unit which transmits the reference signal, a reference signal reception unit which receives the reference signal, a switching unit which selects either the reference signal of the reference signal transmission unit or the reference signal of the reference signal reception unit, a filtering condition table which has the communication cycle when the transmission process unit starts to transmit or when the reception process unit starts to receive and has the reference signal, and a filtering process unit which compares the reference signal passed from the switching unit and the communication cycle to the filtering condition table and starts the transmission process unit or the reception process unit when the reference signal and the communication cycle match the filtering condition table.

Advantages of the Invention

According to the present invention, the reference signal transmission controller or the reference signal reception controller can transmit frames in a cycle in synchronization with the frame of the reference signal transmission controller even when the same communication cycle as the frame cannot be set in the filtering condition of the communication control device. Therefore, the efficiency in the use of the network can be improved and the overhead of the processor in the controller can be reduced.

In addition, according to the present invention, when a reference signal transmission controller is at fault, another controller acts as a reference signal transmission controller, and thereby controllers excluding the failed one can continue to transmit in a cycle.

BRIEF DESCRIPTION OF THE DRAWINGS

FIG. 4 is a table showing a frame of the network in which a round value of the first embodiment is used as a reference signal;

FIG. 5 shows a filtering condition table of the first embodiment;

FIG. 9 shows a filtering condition table of the second embodiment;

FIG. 10 shows a command signal condition table;

FIG. 12 shows a priority table;

FIG. 14 is a table showing a frame over a conventional network;

FIG. 15 is a table showing a frame over a conventional network (a transmitting controller executes cycle control); and FIG. 16 is a table showing a frame of a conventional network (a receiving controller executes cycle control).

DETAILED DESCRIPTION OF THE PREFERRED EMBODIMENTS

Preferable embodiments of the present invention will be described below with reference to the drawings.

First Embodiment

Figure 1:
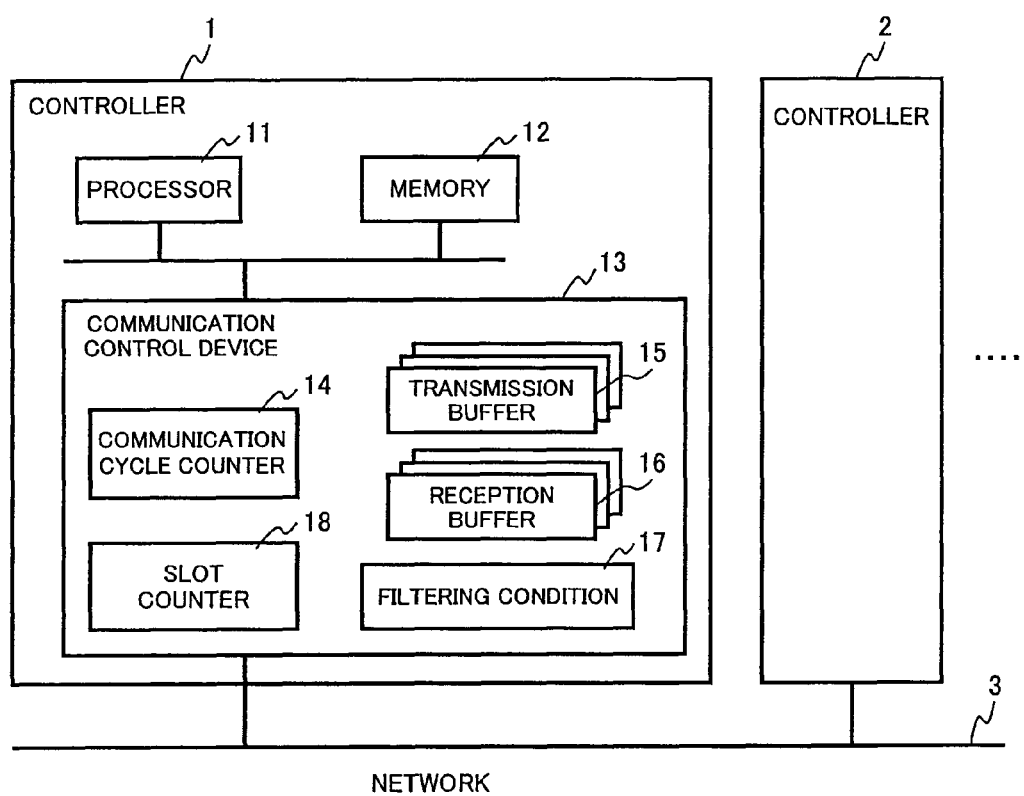
FIG. 1 is a diagram showing a hardware configuration of a network system of the first embodiment according to the present invention.

FIG. 1 is a schematic diagram showing a hardware configuration of a real time control network system (hereinafter, referred to as a "network system") of the first embodiment. As shown in FIG. 1, the hardware configuration of a plurality of controllers 1, 2 (two controllers are shown in FIG. 1) which are connected to a network 3 is basically similar to controllers in conventional network systems. Both controllers 1, 2 include a processor 11, a memory 12 and a communication control device 13, each of which is connected with a bus (an internal bus). Although only two controllers are shown in FIG. 1, the number of controllers may be three or more. The controller 2 has the same configuration as the controller 1. Each controller acts as either a reference signal transmission controller for transmitting a reference signal, which will be described later, or a reference signal reception controller for receiving the reference signal. The plurality of controllers include at least one reference signal transmission controller and at least one reference signal reception controller.

In this embodiment, among the plurality of controllers, a controller which is firstly powered on (started) is determined as the reference signal transmission controller and other controllers are determined as the reference signal reception controllers. As other example, among the plurality of controllers, a controller which outputs a synchronization signal of the network may be determined as the reference signal transmission controller.

The processor 11 reads and writes data stored in the memory 12 as well as executes a program stored in the memory 12.

The communication control device 13 is a hardware which executes time synchronous communication and has functions equivalent to the communication controller of FlexRay. The communication control device 13 has a communication cycle counter 14, a transmission buffer 15, a reception buffer 16, a filter (a filtering condition) 17 and a slot counter 18.

The communication control device 13 counts communication cycles and stores the counts into the communication cycle counter 14. The communication control device 13 of the controller 1 and the communication control device of the controller 2 exchange the communication cycle 1004 between the communication control devices, and are controlled to constantly have the same value of the communication cycle 1004. The slot counter 18 is incremented from 0 at the starting time of the communication cycle. The filtering condition 17 determines a condition of the communication cycle and the slot value when the frame transmission and the frame reception are executed by using a static segment. In the frame transmission, the communication control device 13 transmits frames in which the communication cycle is matched with the slot value based on a filtering condition 17 from the transmission buffer 15 assigned to each frame. In the frame reception, the communication control device 13 receives the frames in which the communication cycle is matched with the slot value based on a filtering condition 17 from the network 3 and stores the frames in the reception buffer 16 which is statically assigned to each frame. When the frame transmission is executed by using the dynamic segment, the communication control device 13 transmits the frames from the transmission buffer 15 at the time when the filtering condition 17 is matched and a transmission request is executed from the processor 11.

Figure 2:
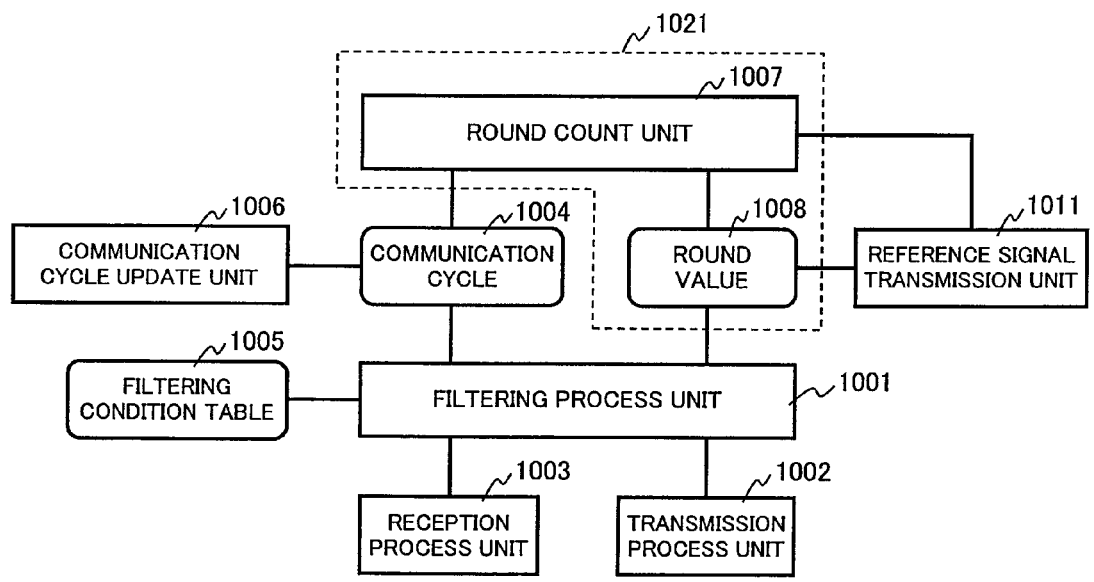
FIG. 2 is a block diagram showing a software configuration of a reference signal transmission controller of the first embodiment.

FIG. 2 is a schematic block diagram showing a software configuration of the reference signal transmission controller. The software of FIG. 2 is stored in the memory 12 and executed by the processor 11. The reference signal transmission controller and the reference signal reception controller, which are implemented by software in this embodiment, may be implemented as hardware.

As shown in FIG. 2, the programs of the reference signal transmission controller include a filtering unit 1001, a transmission process unit 1002, a reception process unit 1003, a communication cycle update unit 1006, a round count unit 1007 and a reference signal transmission unit 1011. Data of the reference signal transmission controller include a communication cycle 1004, a filtering condition table 1005 and a round value 1008. The reference signal is a reference to start transmission or reception of frames. In this embodiment, the round value 1008 is used as the reference signal. A reference signal generation unit 1021 includes the round count unit 1007, which is a program, and the round value, which is data.

The communication cycle update unit 1006 is a program which copies the communication cycle counter 14 to a communication cycle at the top of the communication cycle and keeps the communication cycle 1004 the same in all controllers. The communication cycle update unit 1006 is started by an interruption of a global timer which is synchronized with a clock of the communication control device 13. The interruption of the global timer is previously set to a timing, such as a head of NIT (network idle time), which has sufficient time until the next reference signal is transmitted even when the round count unit 1007 or the reference signal transmission unit 1011 is executed. After updating the communication cycle 1004, the round count unit 1007 is called.

The round count unit 1007 is a program which counts the round value 1008. The round count unit 1007 sets the round value 1008 to 0 when the power supply of the controller is turned on. After this operation, the round count unit 1007 reads the communication cycle 1004 and increments the round value 1008 by one in every time when the communication cycle 1004 becomes the maximum value. In addition, the round count unit 1007 maintains the maximum value of the round value 1008. After incrementing the round value 1008 by one, the round value 1008 is cleared to 0 if "the round value 1008≤the maximum value of the round value 1008." When the round value is incremented or cleared, the reference signal transmission unit 1011 is called. The maximum value of the round is preferably set to a least common multiple of the transmission and reception cycle of all the frames. By this, a transmission and reception timing of all the frames can be determined with a unique combination of the round value 1008 and the communication cycle 1004. In addition, the round count unit 1007 is called from the filtering process unit 1001 and passes the round value 1008. At this time, a value equal to the round value 1008 minus one is passed as the round value only when communication cycle=0. This is because, when communication cycle=0, the reference signal reception controller, which does not receive the newest round value, is required to match the round value in the reference signal transmission controller.

The reference signal transmission unit 1011 transmits the round value 1008 in a statically determined cycle and with previously assigned slots. Specifically, the reference signal transmission unit 1011 writes the reference signal frame including the round value in the transmission buffer 16 and starts transmission in the case of a dynamic frame. Transmission timing of the round value 1008 is a communication cycle when the round value is incremented (or cleared) or every communication cycle.

The filtering process unit 1001 is a program which starts the transmission process unit 1002 or the reception process unit 1003 based on the condition of the communication cycle, the round value and the filtering condition table 1005. The filtering process unit 1001 is started by an interruption of the global timer which is synchronized with the clock of the communication control device 13. The interruption of the global timer is previously set to a timing, such as a head of NIT (network idle time), which has sufficient time to execute the transmission process unit 1002 or the reception process unit 1003.

The filtering process unit 1001 reads the communication cycle 1004 and the round value 1008 after starting. Then, the filtering process unit 1001 detects an entry which matches a combination of the communication cycle 1004 and the round value 1008 from the filtering condition table 1005. FIG. 5 shows the filtering condition tables 1005 of this embodiment. As shown in (a) and (b) in FIG. 5, the round value, the communication cycle, a reception frame ID and a transmission frame ID are stored in each entry. When having detected an entry which matches the condition, the filtering process unit 1001 calls the transmission process unit 1002 using the transmission frame ID of the entry as an argument. In addition, the filtering process unit 1001 calls the reception process unit 1003 using the reception frame ID of the detected entry as an argument.

The transmission process unit 1002 generates a transmission frame from the data generated by an application program. In addition, the transmission process unit 1002 writes the frame of the transmission frame ID in the transmission buffer 15 when called from the filtering unit 1001. When a dynamic segment is used for the frame transmission of the transmission buffer 15, the communication control device 13 is started to transmit the frame over the network. When the static segment is used, the transmission process unit 1002 is not required to start transmission explicitly since the transmission buffer 15 is automatically transmitted in a cycle in every filtering condition 17 by the communication control device 13. In this embodiment, the filtering condition 17 of the slot for the round is "communication cycle=N" (N is a number from 1 to 63) since a round is transmitted in every cycle.

The reception process unit 1003 reads the frame from the reception buffer 16 and stores the reception frame when called from the filtering process unit 1001. In addition, the reception process unit 1003 retrieves data from the reception frame and passes them to an application program. Both when the dynamic segment is used for the frame reception of the reception buffer 16 and when the static segment is used, the reception process unit 1003 reads the reception buffer and confirms whether the newest frame is arrived.

Figure 3:
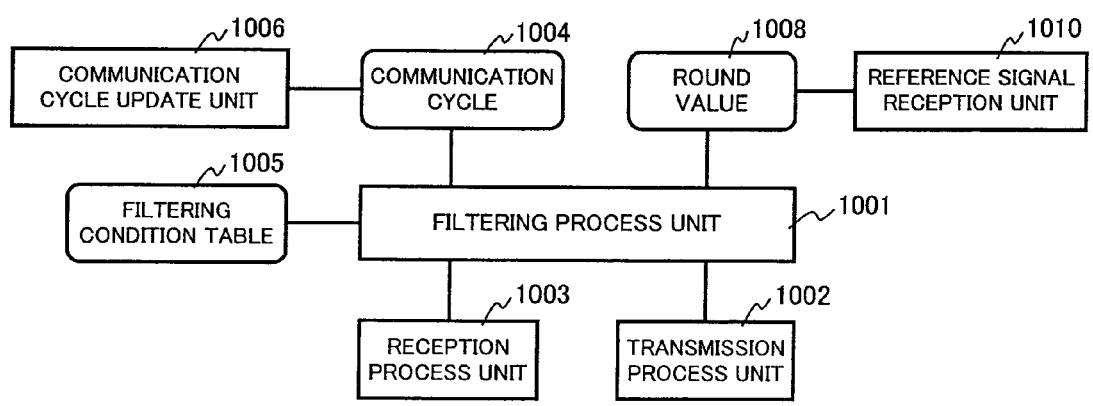
FIG. 3 is a block diagram showing a software configuration of a reference signal reception controller of the first embodiment.

FIG. 3 is a schematic block diagram showing a software configuration of the reference signal reception controller. As shown in FIG. 3, the programs of the reference signal reception controller include the filtering process unit 1001, the transmission process unit 1002, the reception process unit 1003, the communication cycle update unit 1006 and a reference signal reception unit 1010. The data of the reference signal reception controller includes the communication cycle 1004, the filtering condition table 1005 and the round value 1008. Among these programs and data, the filtering process unit 1001, the transmission process unit 1002, the reception process unit 1003, the communication cycle update unit 1006, the communication cycle 1004, the filtering condition table 1005 and the round value 1008 are similar to the programs and data of the above-described reference signal controller, while only the reference signal reception unit 1010 is different.

The reference signal reception unit 1010 is a program which receives the reference signal frame and copies the round value in the frame to the round value 1008. The reference signal reception unit 1010 is started by an interruption of the global timer which is synchronized with the clock of the communication control device 13 or a reception interruption of the communication control device 13.

FIG. 4 shows a frame over a network when communication cycle=4 and frame B is transmitted and received in three cycles, as an example of this embodiment. The filtering condition table in this example is shown in FIG. 5.

As shown in FIG. 4, frame B is transmitted and received with slot 1 and the round value is transmitted and received with slot 2. At the first communication cycle 0, round 0 is transmitted to all controllers, and the round values 1008 of all controllers are set to 0. After communication cycle 0 is terminated, the filtering process unit 1001 searches the filtering condition table 1005 to detect an entry which matches the round value 1008 and the communication cycle 1004. The controller having the filtering condition table shown in (a) in FIG. 5 transmits frame B because round value=0 and communication cycle=1 are matched. The controller having the filtering condition table shown in (b) in FIG. 5 receives frame B. At the next communication cycle 1, the filtering process unit 1004 searches for an entry of round value=0 and communication cycle=2 from the filtering condition table 1005. Both filtering condition tables of transmitting and receiving shown in (a) and (b) in FIG. 5 do not have an entry which satisfies round value=0 and communication cycle=2. As a result, no controllers execute transmission and reception.

As described above, the filtering process unit 1001 searches the filtering condition table 1005 and transmits and receives frames in every one cycle, and thereby even a communication cycle which cannot be supported by the filtering condition 17 defined in the communication control device 13 can be transmitted and received. Since the processor 1 of the receiving controller can finds a reception timing in a cycle transmission and reception other than in a power-of-two cycle, there is no need to confirm validity of the received data by reading the reception buffer in every communication cycle. Therefore, according to the network system of this embodiment, the efficiency in the use of the network can be improved and the overhead of the processor in the controller can be reduced.

Second Embodiment

A network system of the second embodiment according to the present invention will be described with reference to FIG. 6 to FIG. 10.

A hardware configuration of the network system of this embodiment is basically similar to the hardware configuration of FIG. 1. A reference signal transmission controller and a reference signal reception controller are implemented by software similar to the previous embodiment. In the configuration of this embodiment, a command signal, which will be described below, is used as the reference signal, while the round value is used as the reference signal in the configuration of the previous embodiment.

Figure 6:
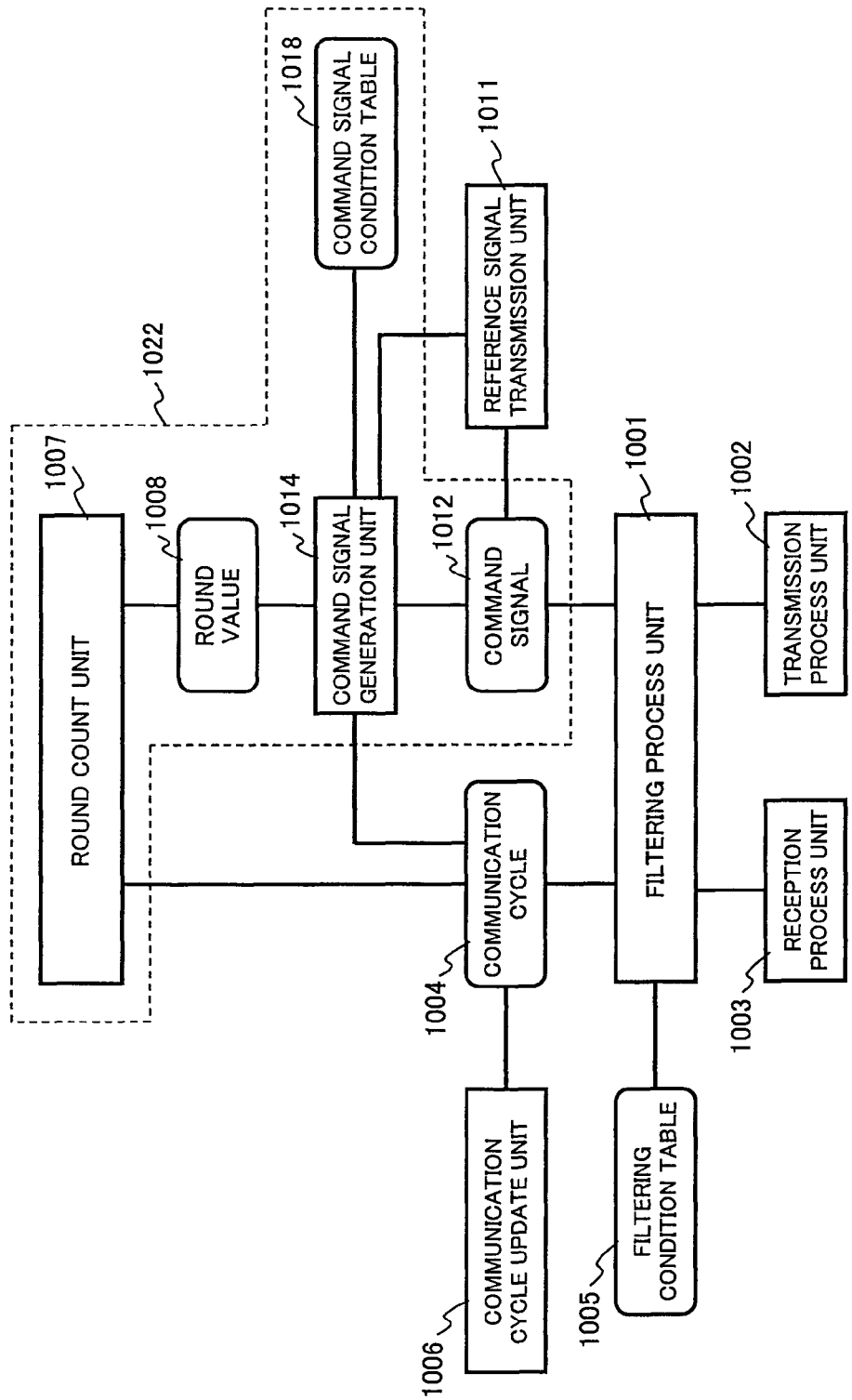
FIG. 6 is a block diagram showing a software configuration of a reference signal transmission controller of the second embodiment.

FIG. 6 is a block diagram showing a software configuration of the reference signal transmission controller. As shown in FIG. 6, programs of the reference signal transmission controller of this embodiment includes a filtering unit 1001, a transmission process unit 1002, a reception process unit 1003, communication cycle update unit 1006, a round count unit 1007, a reference signal transmission unit 1011 and a command signal generation unit 1014. Data of the reference signal transmission controller include a communication cycle 1004, a filtering condition table 1005, a round value 1008, a command signal 1012 and a command signal condition table 1018. These programs and data are the same as the programs and data in the reference signal transmission controller described in FIG. 2 except for the command signal generation unit 1014, the command signal 1012, the reference signal transmission unit 1011, the command signal condition table 1018, the filtering process unit 1001 and the filtering condition table 1005. Therefore, the descriptions thereof are omitted. In this embodiment, a reference signal generation unit 1022 includes the round count unit 1007 and the command signal generation unit 1014, which are programs, and the round value 1008, the command signal 1012 and the command signal condition table 1018, which are data.

The command signal generation unit 1014 is a program which generates a command acting as a reference signal. the command signal generation unit 1014 starts its execution from an interruption of the global timer of the communication control device 13 at, for example, the termination time in every cycle so that generation of command signal is in time for the starting time of the next communication cycle. The command signal generation unit 1014 reads the round value 1008 and the communication cycle 1004, and calculates the round value and the communication cycle in the next communication cycle. After calculating the round value and the communication cycle, the command signal generation unit 1014 searches for an entry which matches the calculation result from the command signal condition table 1018.

FIG. 10 shows a constitution of the command signal condition table 1018. As shown in FIG. 10, a round, a communication cycle and a command signal are recorded in each entry of the command signal condition table 1018. The command signal shows a communication cycle of a frame and an offset from the head of round 0. For example, frame B, which is transmitted and received at the timing shown in FIG. 4, is transmitted and received at round 0 and from communication cycle 1 in every 3 communication cycles. Therefore, frame B has cycle 3 and offset 1. This timing is entered as "communication command of cycle 3 and offset 1" in the command signal condition table 1018. In the command signal, commands in one type of cycles are written in FIG. 10, however, transmission and reception commands having a plurality of types of cycles may be written. In addition, the command signal may have individual entries of the command signal condition table in every cycle.

When there is an entry in which a round value and a communication cycle are matched with the command signal condition table, the command signal of the entry is written in the command signal 1012 and the reference signal transmission unit 1011 is called using the command signal as an argument. When there is no matched entry, the command signal 1012 is cleared.

The reference signal transmission unit 1011 transmits the command signal 1012 using the previously assigned slot when called from the command signal generation unit 1014. Specifically, the reference signal transmission unit 1011 writes the reference signal frame including the command signal in the transmission buffer 16, and starts to transmit in the case of dynamic frame.

The filtering process unit 1001 is a program which starts the transmission process unit 1002 or the reception process unit 1003 based on the command signal 1012 and the filtering condition table 1005. The filtering process unit 1001 is started by an interruption of a global timer which is synchronized with the clock of the communication control device 13. The interruption of the global timer is previously set to a timing, such as a head of NIT (network idle time), which has sufficient time to execute the transmission process unit 1002 or the reception process unit 1003.

The filtering process unit 1001 reads the command signal 1012 after starting. Then, the filtering process unit 1001 detects an entry which matches a command signal from the filtering condition table 1005. FIG. 9 shows the filtering condition tables 1005 of this embodiment. As shown in (a) and (b) in FIG. 9, the command signal, a reception frame ID and a transmission frame ID are stored in each entry. When having detected an entry which matches the condition, the filtering process unit 1005 calls the transmission process unit 1002 using the transmission frame ID of the detected entry as an argument. In addition, the unit calls the reception process unit 1003 using the reception frame ID of the detected entry as an argument.

Figures 7, 8:
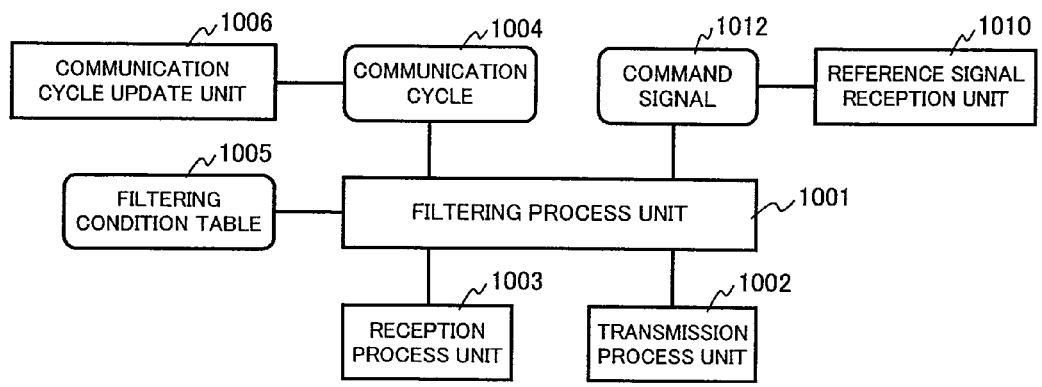
FIG. 7 is a block diagram showing a software configuration of a reference signal reception controller of the second embodiment.
FIG. 8 is a table showing a frame of the network in which a command signal of the second embodiment is used as a reference signal.

FIG. 7 shows a software configuration of the reference signal reception controller. As shown in FIG. 7, the programs of the reference signal reception controller include the filtering unit 1001, the transmission process unit 1002, reception process unit 1003, the communication cycle update unit 1006 and a reference signal reception unit 1010. The data of the reference signal reception controller include the communication cycle 1004, the filtering condition table 1005 and the command signal 1012. These programs and data are similar to the programs and data of the above-described reference signal controller except for the reference signal reception unit 1010.

The reference signal reception unit 1010 is a program which receives the reference signal frame and copies the command signal in the frame to the command signal 1012. The reference signal reception unit 1010 is started in every communication cycle by an interruption of the global timer which is synchronized with the clock of the communication control device 13. When not receiving the command signal, the reference signal reception unit 1010 clears the command signal 1012.

FIG. 8 shows a frame over a network when communication cycle=4 and frame B is transmitted and received in three cycles, as an example of this embodiment. The filtering condition table 1005 in this example is shown in FIG. 9.

As shown in FIG. 8, frame B is transmitted and received with slot 1 and the command signal is transmitted and received with slot 2. At the first communication cycle 0, the command signal "cycle 3, offset 1" is transmitted to all controllers, and the command signals 1012 of all controllers are set to 0. After communication cycle 0 is terminated, the filtering process unit 1001 searches the filtering condition table 1005 to detect an entry which matches the command signal 1012. The reference signal transmission controller having the filtering condition table shown in (a) in FIG. 9 transmits frame B. The reference signal reception controller having the filtering condition table shown in (b) in FIG. 9 receives frame B. At the next communication cycle 1, the command signal 1012 is cleared because the command signal is not transmitted. Therefore, the filtering process unit 1004 does not search for entries. As a result, no controllers execute transmission and reception.

As described above, the filtering process unit 1001 searches the filtering condition table 1005 and transmits and receives frames in every reception of the command signal, and thereby even a cycle which cannot be supported by the filtering condition 17 can be transmitted and received. Therefore, the efficiency in the use of the network can be improved and the overhead of the processor in the controller can be reduced in this embodiment as in the previous embodiment.

Third Embodiment

A network system of the third embodiment according to the present invention will be described with reference to FIG. 11 and FIG. 12.

A hardware configuration of the network system of this embodiment is basically similar to the hardware configuration of FIG. 1. Controllers of this embodiment are implemented by software similar to the above-described embodiments. A reference signal transmission controller and a reference signal reception controller are implemented by software similar to the above-described embodiments. However, the first embodiment has a problem that all the transmissions and receptions of frames stop when the reference signal transmission controller is at fault. To solve this problem, the network system of the third embodiment has a configuration that when the reference signal transmission controller fails, another controller (the reference signal reception controller) acts as a reference signal transmission controller.

Figure 11:
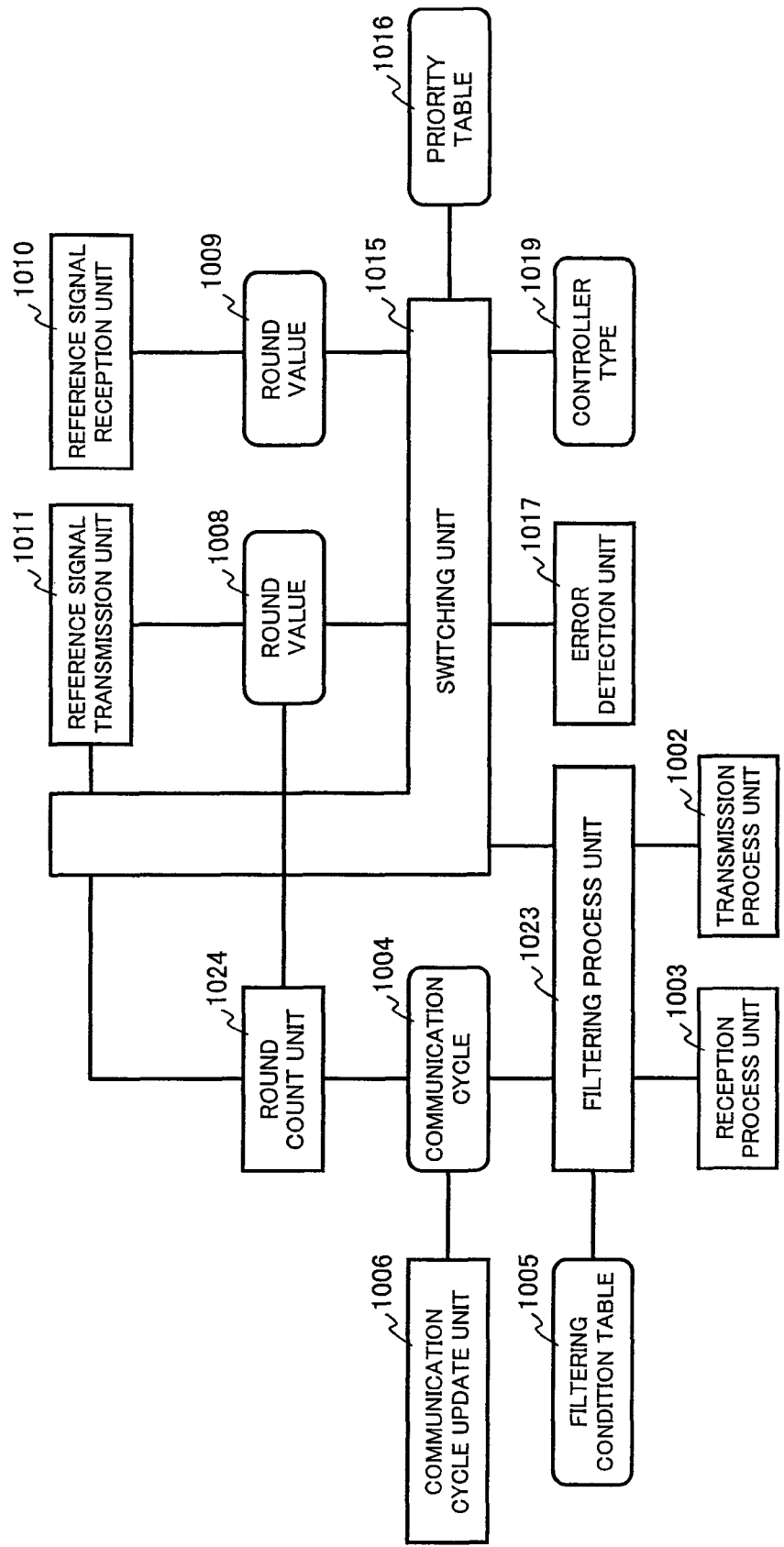
FIG. 11 is a block diagram showing a software configuration of a reference signal transmission and reception controller of the third embodiment.

FIG. 11 shows a software configuration of the controller (a reference signal transmission and reception controller). The controller has both functions of the reference signal transmission controller and the reference signal reception controller which can be switched. As shown in FIG. 11, the controller includes a different filtering process unit 1023 and a different round count unit 1024, and further includes a switching unit 1015, a priority table 1016 an error detection unit 1017 and a controller type 1019, compared to the reference signal transmission controller shown in FIG. 2 and the reference signal reception controller in FIG. 3. The descriptions of the same programs and data as in FIG. 2 and FIG. 3 are omitted.

The controller type 1019 is data indicating whether the controller is "the reference signal transmission controller" or "the reference signal reception controller." Setting of the controller type 1019 is executed by the switching unit 1015.

The round count unit 1024 is a program which counts the round value 1008 and is similar to the above-described round count unit 1007 except for the point described below. The above-described round count unit 1007 calls the reference signal transmission unit 1011 after counting the round value, while, in this embodiment, the round count unit 1024 calls the switching unit 1015 after counting the round value. The switching unit 1015 calls the reference signal transmission unit 1011 if the controller type 1019 is a "reference signal transmission controller."

The filtering process unit 1023 is a program which starts the transmission process unit 1002 or the reception process unit 1003 when the communication cycle 1004 and the round value 1008, 1009 match the condition of the filtering condition table 1005, and is similar to the above-described filtering process unit 1001 except for the point described below. The above-described filtering process unit 1001 directly reads the round value 1008, while, in this embodiment, the filtering process unit 1023 calls the switching unit 1015. The switching unit 1015 returns the round value 1008 if the controller type 1019 is a "reference signal transmission controller." The switching unit 1015 returns the round value 1009 if the controller type 1019 is a "reference signal reception controller."

The error detection unit 1017 is a program which detects a reception time-out of the reference signal frame from the reference signal transmission controller. The error detection unit 1017 sets a timer which is equal to or above the transmission cycle of the reference signal frame if the controller type is a "reference signal reception controller". If the reference signal reception unit 1010 receives a correct reference signal frame before the time-out occurs, the timer is set again. If the time-out occurs, the error detection unit 1017 calls the switching unit 1015. A subsequent process will be described in the description of process of the switching unit 1015.

The switching unit 1015 is a program which determines whether the controller functions as the reference signal transmission controller or the reference signal reception controller and switches processes of the round count unit 1007 and the filtering process unit 1001.

The switching unit 1015 is called when the controller starts or when the error detection unit 1017 detects an error after the controller started. The switching unit 1015 searches the priority table 1016 and reads the controller ID with the highest priority. The controller sets the controller type to a "reference signal transmission controller" when the controller ID which the controller itself has matches the read controller ID. When the controller ID which the controller itself has does not match the read controller ID, the controller type is set to a "reference signal reception controller."

Figure 12:
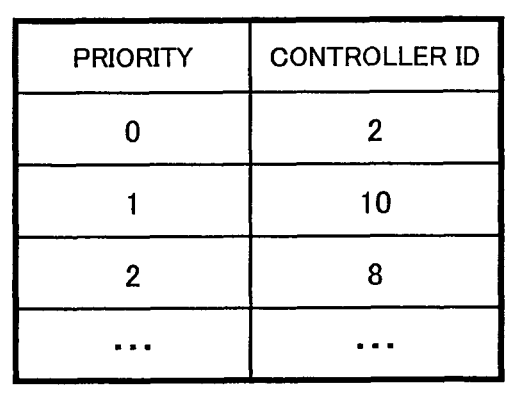

FIG. 12 is shows the priority table 1016. As shown in FIG. 12, the priority table 1016 has a combination of priority and the controller ID. In this embodiment, the controller of controller ID=2 is a reference signal transmission controller when the controllers are started. When the controller of controller ID=2 fails and the reference signal frame is not transmitted correctly for a given period of time, the switching unit 1015 is called by the error detection unit 1017 and searches the priority table 1016 in the controller which is started as another reference signal reception controller. By this search, the controller of controller ID=10 is determined as a new reference signal transmission controller. In this embodiment, the new reference signal transmission controller transmits the reference signal frame using the slot which the previous reference signal transmission controller used. When the new reference signal transmission controller transmits the reference signal frame using its own slot, it is preferable that the predetermined slot is written in the priority table and the slots are switched so that the reference signal reception unit 1010 of the reference signal reception controller receives the predetermined slot.

In the network system of this embodiment, the efficiency in the use of the network can be improved and the overhead of the processor in the controller can be reduced. In addition, even when the reference signal transmission controller is at fault, another controller acts as a reference signal transmission controller and thereby controllers other than the failed one can continue to transmit in a cycle.

Fourth Embodiment

A network system of the fourth embodiment according to the present invention will be described with reference to FIG. 13.

A hardware configuration of the network system of this embodiment is basically similar to the hardware configuration of FIG. 1. Controllers of this embodiment are implemented by software similar to the above-described embodiments. A reference signal transmission controller and a reference signal reception controller are implemented by software similar to the above-described embodiment.

However, the second embodiment has a problem that all the transmissions and receptions of frames stop when the reference signal transmission controller is at fault. To solve this problem, the network system of this embodiment has a configuration that when the reference signal transmission controller fails, another controller (a reference signal reception controller) acts as a reference signal transmission controller.

Figure 13:
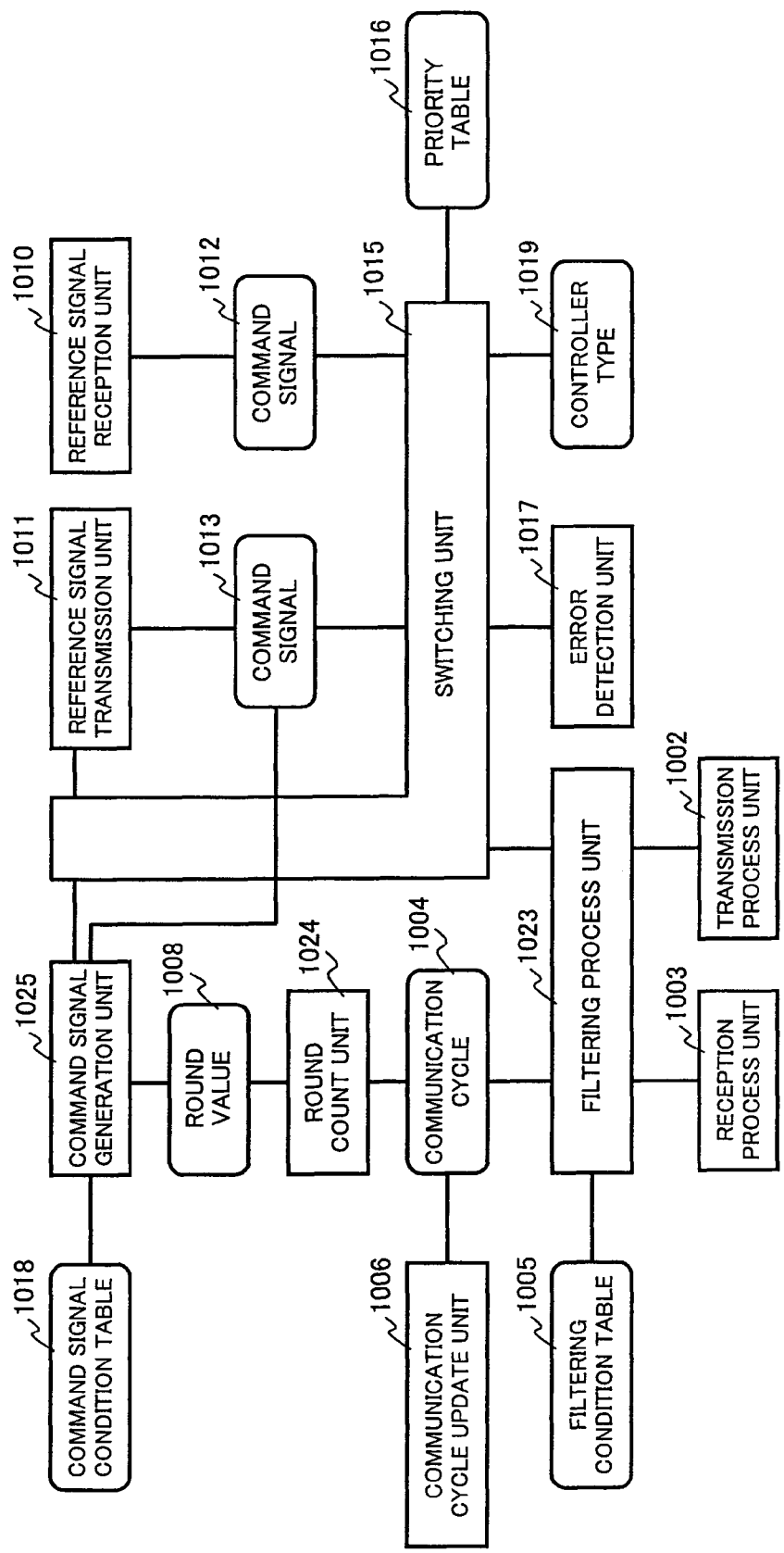
FIG. 13 is a block diagram showing a software configuration of a reference signal transmission and reception controller of the fourth embodiment.

FIG. 13 shows a software configuration of the controller (a reference signal transmission and reception controller). The controller has both functions of the reference signal transmission controller and the reference signal reception controller which can be switched. As shown in FIG. 13, the controller includes a different filtering process unit 1023 and a different command signal generation unit 1025, and further includes a switching unit 1015, a priority table 1016 an error detection unit 1017 and a controller type 1019, compared to the reference signal transmission controller shown in FIG. 6 and the reference signal reception controller in FIG. 7. The descriptions of the same programs and data as in FIG. 6 and FIG. 7 are omitted. The switching unit 1015, the error detection unit 1017, the priority table 1016 and the controller type 1019 are the same as in the third embodiment. Therefore, the descriptions thereof are omitted.

The command signal generation unit 1025 is a program which generates a command acting as a reference signal and is similar to the above-described command signal generation unit 1014 except for the point described below. The above-described command signal generation unit 1014 calls the reference signal transmission unit 1011 using the command signal 1012 as an argument, while, in this embodiment, the command signal generation unit 1025 calls the switching unit 1015 using the command signal 1012 as an argument.

The filtering process unit 1023 is a program which starts the transmission process unit 1002 or the reception process unit 1003 when the condition of the filtering condition table 1005 is matched and is similar to the filtering process unit 1001 of the second embodiment except for the point described below. The filtering process unit 1023 of the second embodiment directly reads the command signal 1013, while the filtering process unit 1023 calls the switching unit 1015.

In the network system of this embodiment, as in the case of the network system of the third embodiment, the efficiency in the use of the network can be improved and the overhead of the processor in the controller can be reduced. In addition, even when the reference signal transmission controller is at fault, another controller acts as a reference signal transmission controller and thereby controllers other than the failed one can continue to transmit in a cycle.

The present invention is not limited to the embodiments described above and other various embodiments of the present invention can be expected. In the first and the second embodiments, the examples are described in which configuration of each of the controllers is either the reference signal transmission controller or the reference signal reception controller. However, one controller may have both functions of the reference signal transmission controller and the reference signal reception controller, both functions being switched to use. Specifically, for the first embodiment, the priority table and the error detection unit are excluded in the configuration shown in FIG. 11 described in the third embodiment. For the second embodiment, the priority table and the error detection unit are excluded in the configuration shown in FIG. 13 described in the fourth embodiment.

In the third and the fourth embodiments, the case is described where the reference signal transmission controller is failed. The case where the reference signal reception controller is failed is similar to the above description.

EXPLANATIONS OF REFERENCE NUMERALS 1, 2 controller
3 network
13 communication control device
14 communication cycle counter
17 filtering condition
1001, 1023 filtering process unit
1002 transmission process unit
1003 reception process unit
1004 communication cycle
1005 filtering condition table
1006 communication cycle update unit
1007, 1024 round count unit
1008, 1009 round value
1010 reference signal reception unit
1011 reference signal transmission unit
1012, 1013 command signal
1014, 1025 command signal generation unit
1015 switching unit
1016 priority table
1017 error detection unit
1018 command signal condition table
1021, 1022 reference signal generation unit

What is claimed is:

1. A real time control network system comprising:
a plurality of controllers connected through a bus, each of the controllers including a transmission process unit which transmits a frame in every communication cycle with assigning a slot and a reception process unit which receives the frame from the assigned slot, the frame being transmitted and received among the controllers; wherein
the communication cycle is counted again from 0 after the communication cycle is counted from 0 to a maximum value;
the plurality of controllers includes:
at least one reference signal transmission controller having a reference signal generation unit which receives the communication cycle and generates a reference signal, the reference signal acting as a reference for starting transmission of the frame or starting reception of the frame, and a reference signal transmission unit which transmits the reference signal; and
at least one reference signal reception controller having a reference signal reception unit which receives the reference signal;
each of the controllers further includes a communication cycle update unit which keeps the communication cycle among the plurality of controllers the same, a filtering condition table which has the communication cycle at the time when the transmission process unit starts to transmit or at the time when the reception process unit starts to receive and has the reference signal, and a filtering process unit which compares the reference signal and the communication cycle to the filtering condition table and starts the transmission process unit or the reception process unit when the communication cycle and the reference signal match a condition of the filtering condition table;
each of the controllers includes a round value which counts repeating numbers of the communication cycle;
the reference signal generation unit includes a round count unit which updates the round value when the communication cycle becomes a maximum value, a command signal condition table which at least has the communication cycle at the time when the transmission process unit starts to transmit or at the time when the reception process unit starts to receive and the round value, and a command signal generation unit which compares the round value and the communication cycle to the filtering condition table and generates a command signal when a condition is matched, the command signal indicating a communication cycle of the frame and an offset from round 0; and
the command signal is used as the reference signal.

2. The real time control network system according to claim 1, wherein the reference signal transmission controller is a controller which is firstly powered on among the plurality of controllers.

3. The real time control network system according to claim 2,
wherein a maximum value of the round value is a least common multiple of transmission and reception cycles of each frame.

4. The real time control network system according to claim 1, wherein the reference signal transmission controller is a controller which outputs a synchronization signal of a network among the plurality of controllers.

5. The real time control network system according to claim 4,
wherein a maximum value of the round value is a least common multiple of transmission and reception cycles of each frame.

6. The real time control network system according to claim 1,
wherein a maximum value of the round value is a least common multiple of transmission and reception cycles of each frame.

7. An on-vehicle network system which executes time synchronous communication among a plurality of on-vehicle electronics devices equipped on a vehicle, comprising:
a real time control network system according to claim 1.

8. The real time control network system according to claim 1,
wherein the reference signal transmission controller is a controller which is firstly powered on among the plurality of controllers.

9. The real time control network system according to claim 1,
wherein the reference signal transmission controller is a controller which outputs a synchronization signal of a network among the plurality of controllers.

10. The real time control network system according to claim 1, wherein a maximum value of the round value is a least common multiple of transmission and reception cycles of each frame.

11. A real time control network system comprising:
a plurality of controllers connected through a bus, each of the controllers including a transmission process unit which transmits a frame in every communication cycle with assigning a slot and a reception process unit which receives the frame from the assigned slot, the frame being transmitted and received among the controllers; wherein
the communication cycle is counted again from 0 after the communication cycle is counted from 0 to the maximum value;
each of the controllers includes:
a communication cycle update unit which keeps the communication cycle among the plurality of controllers the same,
a reference signal generation unit which receives the communication cycle and generates a reference signal, the reference signal acting as a reference for starting transmission of the frame or starting reception of the frame,
a reference signal transmission unit which transmits the reference signal,
a reference signal reception unit which receives the reference signal,
a switching unit which selects either the reference signal of the reference signal transmission unit or the reference signal of the reference signal reception unit,
a filtering condition table which has the communication cycle when the transmission process unit starts to transmit or when the reception process unit starts to receive and has the reference signal,
a filtering process unit which compares the reference signal passed from the switching unit and the communication cycle to the filtering condition table and starts the transmission process unit or the reception process unit when the reference signal and the communication cycle match the filtering condition table,
a priority table which determines the reference signal transmission controller or the reference signal reception controller from among the plurality of controllers; and
an error detection unit which detects a transmission error of the reference signal transmission controller; wherein
the switching unit selects the reference signal transmission controller based on a priority in the priority table.

12. The real time control network system according to claim 11,
wherein each of the controllers includes a round value which counts repeating numbers of the communication cycle;
wherein the reference signal generation unit has a round count unit which updates the round value when the communication cycle becomes the maximum value; and
wherein the round value is used as the reference signal.

13. The real time control network system according to claim 12,
wherein a maximum value of the round value is a least common multiple of transmission and reception cycles of each frame.

14. The real time control network system according to claim 11,
wherein each of the controllers includes a round value which counts repeating numbers of the communication cycle;
wherein the reference signal generation unit includes a round count unit which updates the round value when the communication cycle becomes the maximum value, a command signal condition table which at least has the communication cycle at the time when the transmission process unit starts to transmit or at the time when the reception process unit starts to receive and the round value, and a command signal generation unit which compares the round value and the communication cycle to the filtering condition table and generates a command signal when a condition is matched, the command signal indicating a communication cycle of the frame and an offset from round 0; and
wherein the command signal is used as the reference signal.

15. The real time control network system according to claim 14,
wherein a maximum value of the round value is a least common multiple of transmission and reception cycles of each frame.

16. The real time control network system according to claim 11,
wherein each of the controllers includes a round value which counts repeating numbers of the communication cycle;
wherein the reference signal generation unit has a round count unit which updates the round value when the communication cycle becomes the maximum value; and
wherein the round value is used as the reference signal.

17. The real time control network system according to claim 11,
- wherein each of the controllers includes a round value which counts repeating numbers of the communication cycle;
- wherein the reference signal generation unit includes a round count unit which updates the round value when the communication cycle becomes the maximum value, a command signal condition table which at least has the communication cycle at the time when the transmission process unit starts to transmit or at the time when the reception process unit starts to receive and the round value, and a command signal generation unit which compares the round value and the communication cycle to the filtering condition table and generates a command signal when a condition is matched, the command signal indicating a communication cycle of the frame and an offset from round 0; and
- wherein the command signal is used as the reference signal.

* * * * *